United States Patent
Nakamura

(10) Patent No.: US 10,922,039 B2
(45) Date of Patent: Feb. 16, 2021

(54) IMAGE PROCESSING APPARATUS, INFORMATION PROCESSING METHOD, AND STORAGE MEDIUM

(71) Applicant: CANON KABUSHIKI KAISHA, Tokyo (JP)

(72) Inventor: Shun Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/292,009

(22) Filed: Mar. 4, 2019

(65) Prior Publication Data

US 2019/0272135 A1    Sep. 5, 2019

(30) Foreign Application Priority Data

Mar. 5, 2018   (JP) ................................. 2018-038819
Jun. 21, 2018  (JP) ................................. 2018-117968

(51) Int. Cl.
*G06F 3/12* (2006.01)

(52) U.S. Cl.
CPC .......... *G06F 3/1263* (2013.01); *G06F 3/1204* (2013.01); *G06F 3/1205* (2013.01); *G06F 3/1274* (2013.01)

(58) Field of Classification Search
CPC .... G06F 3/1263; G06F 3/1204; G06F 3/1205; G06F 3/1274; G06F 8/60; G06F 3/1211; G06F 3/126; G06F 3/1268; H04N 2201/0094
See application file for complete search history.

(56) References Cited

U.S. PATENT DOCUMENTS

2017/0228200 A1*  8/2017  Kessels ................... G06F 3/126
2017/0308341 A1* 10/2017  Ormond ................ G06F 3/1285

FOREIGN PATENT DOCUMENTS

JP              200720030 A    1/2007

* cited by examiner

*Primary Examiner* — Iriana Cruz
(74) *Attorney, Agent, or Firm* — Canon U.S.A., Inc. IP Division

(57) ABSTRACT

In a case where it is determined that any job in a queue other than a job at the head of the queue is a first job, an image processing module is requested to execute processing based on a first job acquired from the queue. On the other hand, in a case where it is determined that no job in the queue other than the job at the head of the queue is the first job, the image processing module is requested to execute processing based on a second job different from the first job acquired from the head of the queue, and when the processing by the image processing module is completed, the determination by a determination unit is executed again.

9 Claims, 14 Drawing Sheets

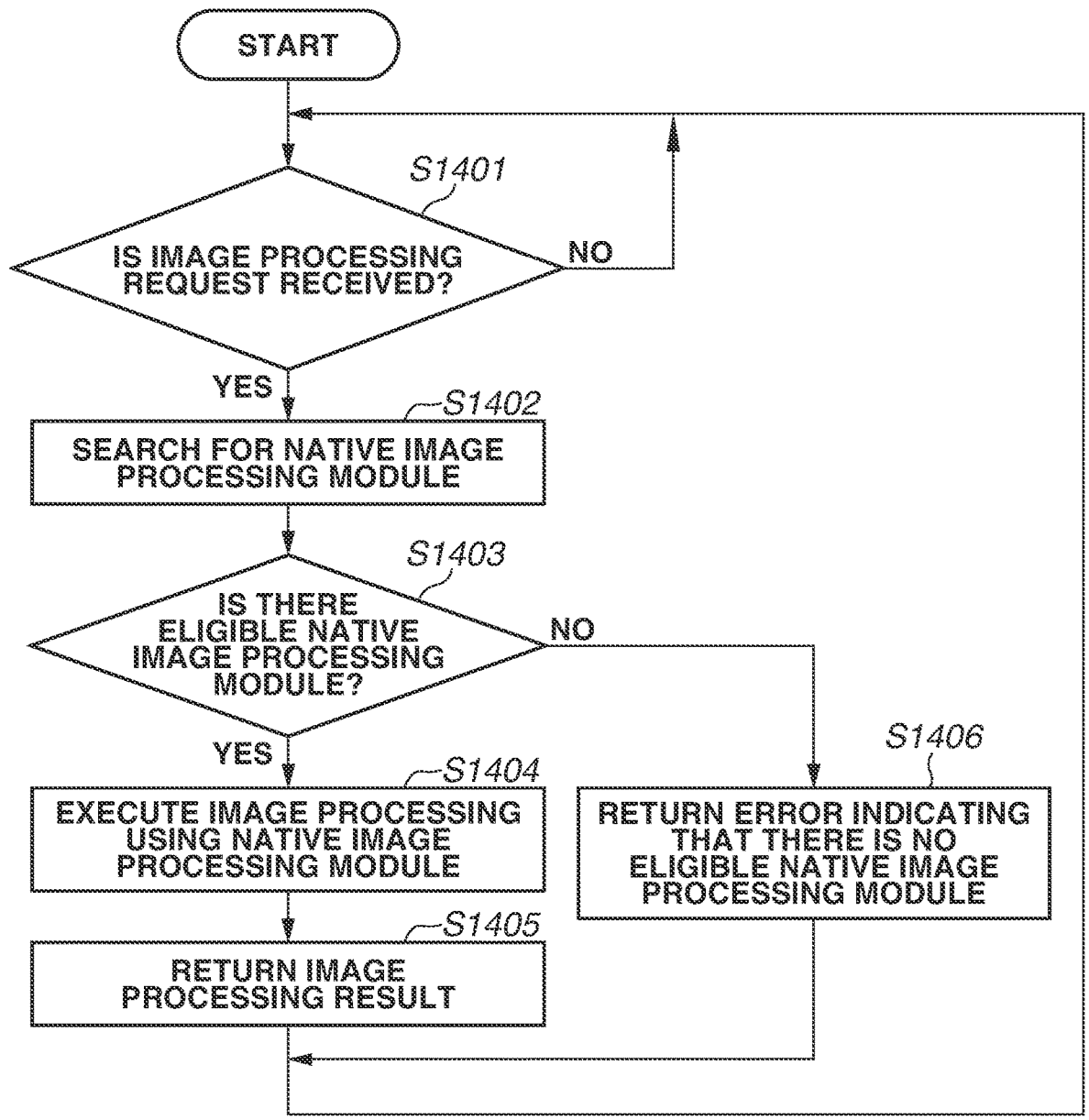

IMAGE PROCESSING APPARATUS, INFORMATION PROCESSING METHOD, AND STORAGE MEDIUM

BACKGROUND

Field of the Disclosure

The present disclosure relates to an image processing apparatus, an information processing method, and a program.

Description of the Related Art

There is a known technique for executing various jobs including image processing that is not provided by an image forming apparatus. In this method, an application for executing new image processing is generated as a plug-in and installed into the image forming apparatus to realize execution of the jobs (Japanese Patent Application Laid-Open No. 2007-20030).

In the foregoing configuration, the plug-in may execute image processing not directly but using an image processing execution module provided as embedded software in the image forming apparatus, depending on the image processing to be used, in order to prioritize the execution speed. In general, however, it is difficult to change a module of embedded software to add a function or improve stability. Thus, in a case where the execution module has an implementation constraint, it is undesirable to cause the execution module to execute a modification afterward to overcome the constraint, from the viewpoint of development efficiency. An example of an implementation constraint as discussed herein is that an image processing module is unable to process a plurality of processing requests simultaneously in a case where the plurality of image processing requests is made at the same time with respect to the image processing module. If image processing jobs for the image processing module having such a constraint become congested, the image processing module cannot receive any subsequent image processing jobs.

In the configuration discussed in the conventional technique, if the plug-in is called from a plurality of applications in the case where the embedded image processing modules used by the plug-in is unable to perform operations simultaneously and is only able to operate in a single process, a response to the application that subsequently calls the plug-in becomes an error. Further, for example, in a case where the processing to be executed by an application is searchable portable document format (searchable PDF) generation processing, it takes time to process all pages. Thus, the user needs to wait, and in a case where a subsequent application is a function connected to a responsiveness to a user operation, the responsiveness decreases.

SUMMARY

The present disclosure is directed to a technique capable of preventing a decrease in responsiveness to a user. According to an aspect of the present disclosure, an image processing apparatus including an image processing module incapable of simultaneously processing a plurality of jobs includes a reception unit configured to receive a request for image processing using the image processing module, a registration unit configured to register a single job in a queue in response to each request received by the reception unit, a determination unit configured to determine whether any job in the queue other than the job at a head of the queue is a first job, based on an attribute of each job contained in the queue, and a request unit configured to request the image processing module to execute processing based on the job acquired from the queue, wherein in a case where the determination unit determines that any job in the queue other than the job at the head of the queue is the first job, the request unit requests the image processing module to execute processing based on the first job acquired from the queue, whereas in a case where the determination unit determines that no job in the queue other than the job at the head of the queue is the first job, the request unit requests the image processing module to execute processing based on a second job different from the first job acquired from the head of the queue, and wherein when the processing by the image processing module is completed, the determination by the determination unit is executed again.

Further features of the present disclosure will become apparent from the following description of exemplary embodiments with reference to the attached drawings.

BRIEF DESCRIPTION OF THE DRAWINGS

FIG. 14 is a flowchart illustrating an example of information processing.

DESCRIPTION OF THE EMBODIMENTS

Various exemplary embodiments of the present disclosure will be described below with reference to the drawings.

Figure 1:
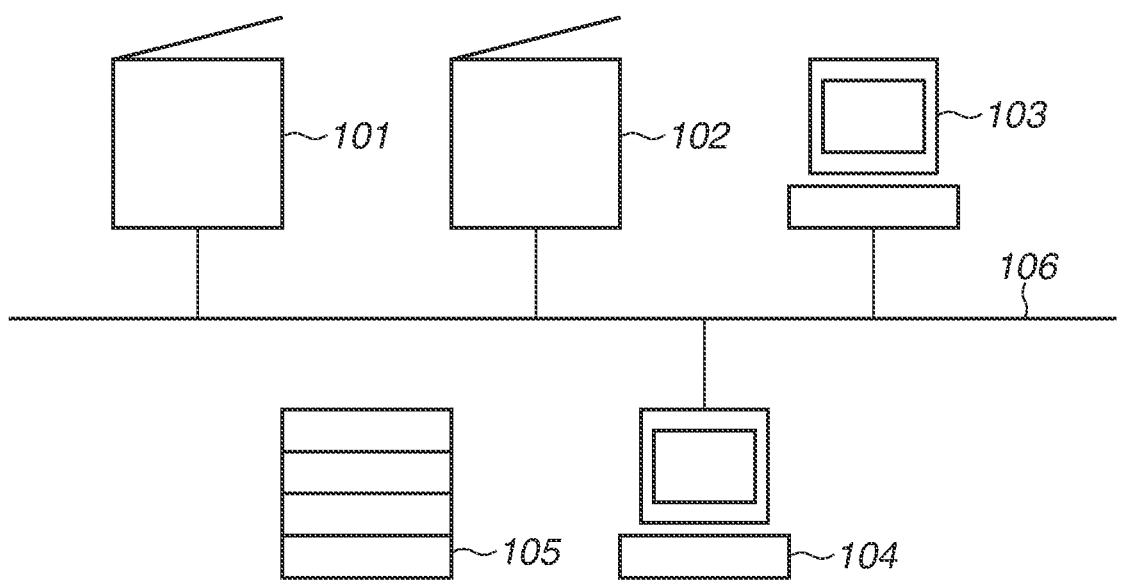
FIG. 1 is a diagram illustrating an example of a system configuration of an image forming system.

A first exemplary embodiment will be described below with reference to the attached drawings. FIG. 1 is a diagram illustrating an example of a system configuration of an image forming system. The image forming system includes image forming apparatuses 101 and 102, information processing terminals 103 and 104, and a server 105. The image forming apparatuses 101 and 102, the information processing terminals 103 and 104, and the server 105 are communicably connected to one another via a network 106.

While FIG. 1 illustrates a case where there are two image forming apparatuses 101 and 102 as an example, the number of image forming apparatuses can be any number (one or two or more). Further, the image forming apparatuses 101 and 102 can respectively be realized by the same apparatus. Thus, hereinafter, the image forming apparatus 101 will be described below as a representative of the image forming apparatuses 101 and 102, and detailed description of the image forming apparatus 102 will be omitted. The network 106 can be any network via which the apparatuses in the image forming system can communicate with each other, such as a local area network (LAN) or the Internet.

The image forming apparatus 101 is capable of receiving an image data print request (print data) from the information processing terminals 103 and 104 and printing the print data, reading image data with a scanner of the image forming apparatus 101, and printing the image data read by the scanner. Further, the image forming apparatus 101 is capable of storing print data received from the information processing terminals 103 and 104 and transmitting an image read by the scanner of the image forming apparatus 101 to the information processing terminals 103 and 104. Further, the image forming apparatus 101 is capable of performing image processing using the server 105 and printing a document stored on the server 105. The image forming apparatus 101 is also capable of realizing a function of a publicly-known image forming apparatus such as a multi-function peripheral (MFP).

Figure 2:
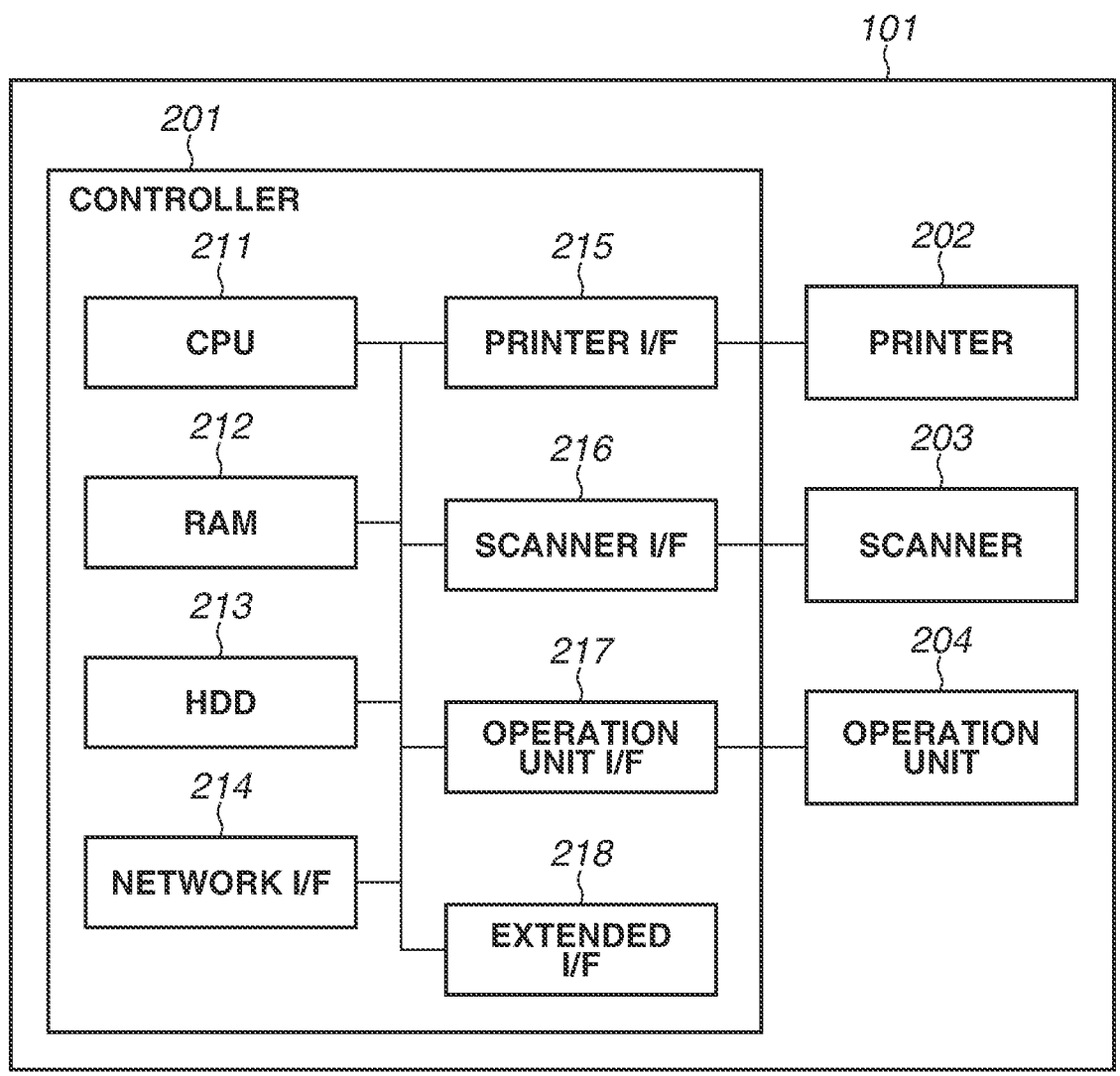
FIG. 2 is a diagram illustrating an example of a hardware configuration of an image forming apparatus.

FIG. 2 is a diagram illustrating an example of the hardware configuration of the image forming apparatus 101.

The image forming apparatus 101 includes a controller 201, a printer 202, a scanner 203, and an operation unit 204. The controller 201 includes a central processing unit (CPU) 211, a random-access memory (RAM) 212, a hard disk drive (HDD) 213, a network interface (I/F) 214, a printer I/F 215, a scanner I/F 216, an operation unit I/F 217, and an extended I/F 218. The CPU 211 is capable of transmitting and receiving data to and from the RAM 212, the HDD 213, the network I/F 214, the printer I/F 215, the scanner I/F 216, the operation unit I/F 217, and the extended I/F 218. Further, the CPU 211 loads a program read from the HDD 213 onto the RAM 212 and executes the program loaded on the RAM 212. The CPU 211 executes processing based on the program to thereby realize the software configurations illustrated in FIGS. 3 and 11 and the processes illustrated in the flowcharts in FIGS. 4 to 7, 9, 10, and 12 to 14.

In the HDD 213, a program that is executable by the CPU 211, a setting value for use by the image forming apparatus 101, data on user-requested processing, etc. can be stored. The RAM 212 is an area for temporarily storing a program read from the HDD 213 by the CPU 211. Further, the RAM 212 can store various data necessary to execute a program. For example, in image processing, input data is loaded onto the RAM 212 so that processing becomes executable.

The network I/F 214 is an interface for performing network communication with an apparatus in the image forming system. The network I/F 214 is capable of transmitting a notification that data is received to the CPU 211 and is also capable of transmitting data on the RAM 212 to the network 106. The printer I/F 215 is capable of transmitting print data transmitted from the CPU 211 to the printer 202 and transmitting a printer state received from the printer 202 to the CPU 211. The scanner I/F 216 is capable of transmitting an image reading instruction transmitted from the CPU 211 to the scanner 203, transmitting image data received from the scanner 203 to the CPU 211, and transmitting a state received from the scanner 203 to the CPU 211. The operation unit I/F 217 is capable of transmitting a user instruction input via the operation unit 204 to the CPU 211 and transmitting screen information for user operations to the operation unit 204. The extended/F 218 is an interface that enables an external device to connect to the image forming apparatus 101. The extended I/F 218 includes, for example, a universal serial bus (USB) interface. An external storage apparatus such as a USB memory is connected to the extended I/F 218 to thereby enable the image forming apparatus 101 to read data stored in the external storage apparatus and write data to the external storage apparatus.

The printer 202 is capable of printing image data received from the printer I/F 215 on a sheet and transmitting the state of the printer 202 to the printer I/F 215. The scanner 203 is capable of reading information displayed on the sheet placed on the scanner 203, digitalizing the read information, and transmitting the digitalized information to the scanner I/F 216, according to an image reading instruction received from the scanner I/F 216. Further, the scanner 203 is capable of transmitting the state of the scanner 203 to the scanner I/F 216. The operation unit 204 is an interface via which the user performs operations to input various instructions to the image forming apparatus 101. For example, the operation unit 204 includes a liquid crystal screen including a touch panel, provides an operation screen to the user, and receives user operations.

Figure 3:
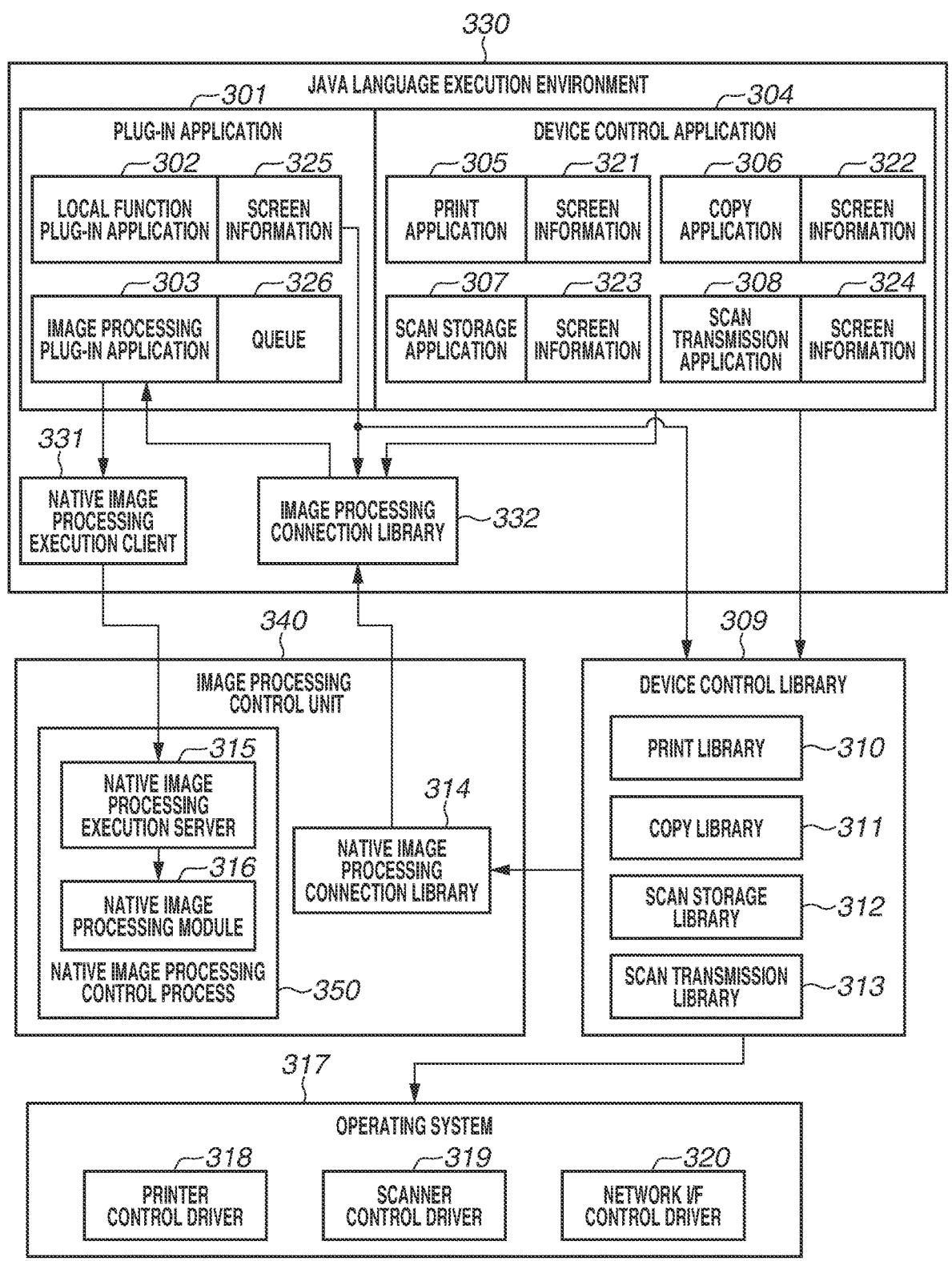
FIG. 3 is a hierarchy chart schematically illustrating an example of a software structure.

FIG. 3 is a hierarchy chart schematically illustrating an example of the software configuration of the image forming apparatus 101 in the first exemplary embodiment. In FIG. 3, there is a relationship that an upper layer uses a service provided by a lower layer, except for some exceptions.

In FIG. 3, the lowermost layer is a layer that includes an operating system 317 and manages execution of a program, memory, etc. In the operating system 317 are embedded a printer control driver 318, a scanner control driver 319, and a network I/F control driver 320. The printer control driver 318, the scanner control driver 319, and the network I/F control driver 320 can function by cooperating with one another. The printer control driver 318 is software for controlling the printer 202 via the printer I/F 215. The scanner control driver 319 is software for controlling the scanner 203 via the scanner I/F 216. The network I/F control driver 320 is software for controlling the network I/F 214.

The second layer from the bottom includes a device control library 309 and an image processing control unit 340. In the present exemplary embodiment, the device control library 309 and the image processing control unit 340 are described in a compiled language, such as C or C++, and stored in the HDD 213 as embedded software in an object file format that is directly executable by the CPU 211. In the present exemplary embodiment, an execution environment of such an embedded software group will be referred to as "native execution environment" or "native". The device control library 309 is statically or dynamically linked to a local function plug-in 302 or a device control application 304 described below. Further, the device control library 309 uses the operating system 317 based on an instruction from an application program. Further, the device control library 309 is capable of requesting a native image processing connection library 314 to execute image processing.

Next, the following describes an example of the device control library 309.

A print library 310 is a library configured to provide an application programming interface (API) for controlling a print job using the function of the printer control driver 318. The print job refers to a series of processing including printing print data stored in the HDD 213 of the image forming apparatus 101 or printing print data received from an external apparatus via the network I/F 214. The external apparatus is, for example, the information processing terminals 103 and 104.

A copy library 311 is a library configured to provide an API for controlling a copy job using the functions of the scanner control driver 319 and the printer control driver 318. The copy job refers to a series of processing including printing image data scanned by the scanner 203 using the printer 202.

A scan storage library 312 is a library configured to provide an API for controlling a scan storage job using the function of the scanner control driver 319. The scan storage job refers to a series of processing including converting image data scanned by the scanner 203 into print data or general-purpose format and then storing the converted data in the HDD 213 or the external storage apparatus such as a USB memory connected to the extended I/F 218. The general-purpose format is, for example, a portable document format (PDF) data format or Joint Photographic Experts Group (JPEG) data format.

A scan transmission library 313 is a library configured to provide an API for controlling a scan transmission job using the functions of the scanner control driver 319 and the network I/F control driver 320. The scan transmission job refers to a series of processing including converting image data scanned by the scanner 203 into a general-purpose format and then transmitting the converted data to a file server via the network I/F 214 or attaching the converted data to an electronic mail and transmitting the electronic mail with the attached converted data to an external apparatus. The file server is, for example, the server 105. The external apparatus is, for example, the information processing terminals 103 and 104.

The image processing control unit 340 includes the native image processing connection library 314, a native image processing execution server 315, and a native image processing module 316. If the native image processing connection library 314 receives an image processing execution request from the device control library 309, the native image processing connection library 314 transfers the content of the request to an image processing connection library 332. The native image processing execution server 315 provides the function of executing the native image processing module 316 in response to a request from software described in the Java (registered trademark) language described below. The native image processing module 316 is software capable of executing various types of image processing. The native image processing execution server 315 and the native image processing module 316 are executed on a native image processing control process 350 which is a program execution unit including a logic memory space separated from the other software illustrated in FIG. 3. A possible specific method of separating the memory space is a method using a process mechanism of a commonly-used operating system, or any other methods can be employed. Since the logic memory space is separated, in the case of executing image processing as described above, even if an error occurs during processing when executing a complicated computation or memory operation associated therewith, the requester of the processing is prevented from being affected by the error. The native image processing module 316 is an example of an image processing module incapable of simultaneously processing a plurality of jobs.

A Java language execution environment 330, which is the uppermost layer, is an application layer including a plug-in application (hereinafter "plug-in") 301 and the device control application 304. In the present exemplary embodiment, the plug-in 301 and the device control application 304 are described in the Java language and stored in the HDD 213 in a Java bytecode format interpreted by a Java virtual machine. Thus, the CPU 211 executes a program of the Java virtual machine and the Java virtual machine reads and executes the Java bytecode, whereby the processing is performed. A reason for the use of such a programming language is the case of program description. In Java, the developer does not have to manage the memory area, and the memory area is managed automatically. Thus, the burden in describing a program is reduced, and development efficiency is expected to improve. Each application provides various functions by operating using the APIs of the device control library 309 and the image processing connection library 332. Further, the device control application 304 can extend the function of the device control application 304 by a firmware update. A print application 305, a copy application 306, a scan storage application 307, and a scan transmission application 308 of the device control application 304 respectively include screen information 321, 322, 323, and 324. The CPU 211 displays the screen information 321, 322, 323, and 324 on the operation unit 204 via the operation unit I/F 217. If the CPU 211 detects a change to the settings of the device control application 304 that is made by a user operation on the operation unit 204, the CPU 211 writes the details of the change to the HDD 213. If the CPU 211 (device control application 304) detects a job execution request input via the operation unit 204, the CPU 211 starts a job by calling the API of the device control library 309. Further, the device control application 304 can request the image processing connection library 332 to execute image processing.

Next, an example of the device control application 304 will be described. The print application 305 executes a print job by calling the API of the print library 310. The copy application 306 executes a copy job by calling the API of the copy library 311. The scan storage application 307 executes a scan storage job by calling the API of the scan storage library 312. The scan transmission application 308 executes a scan transmission job by calling the API of the scan transmission library 313.

Next, an example of the plug-in 301 will be described below. The plug-in 301 is an application that is installable and uninstallable as a plug-in into and from the image forming apparatus 101 separately from the device control application 304, which is a resident application. The plug-in 301 includes a local function plug-in application (hereinafter "local function plug-in") 302 and an image processing plug-in application (hereinafter "image processing plug-in") 303. The plug-in 301 is packaged with a program necessary for the respective operations. The plug-in 301 is installed into the image forming apparatus 101 using a remote user interface (UI), etc. The remote UI is a system for accessing the image forming apparatus 101 from a web browser of an external apparatus via the network I/F 214 to check the status of the image forming apparatus 101, perform a print job operation, and set various settings. The external apparatus is, for example, the information processing terminals 103 and 104. Further, each plug-in 301 (local function plug-in 302 and image processing plug-in 303) can be activated and stopped independently.

An example of a series of processing by which the plug-in 301 is installed, activated, stopped, and uninstalled will be described.

In a case where the CPU 211 detects an installation of the plug-in 301, the CPU 211 stores information of the plug-in 301 in the HDD 213. Then, if the CPU 211 detects an instruction to start the plug-in 301, the CPU 211 gives an instruction to activate the plug-in 301. The plug-in 301 can execute the content of each program while the plug-in 301 is in an activated state. Then, if the CPU 211 detects an instruction to stop the plug-in 301, the CPU 211 gives an instruction to the plug-in 301 to stop. Further, if the CPU 211 detects an instruction to uninstall the plug-in 301, the CPU 211 erases the information of the plug-in 301 from the HDD 213. The foregoing instructions can be given from, for example, the remote UI or the operation unit 204 or anything else.

Next, an example of the local function plug-in 302 will be described. The local function plug-in 302 includes the screen information 325. The local function plug-in 302 is capable of providing the user with a function and screen different from those of the device control application 304, which is a resident application, by calling the API of the device control library 309. For example, the local function plug-in 302 can provide a combination of a plurality of functions, such as the function of copying and scanning image data and transmitting a document to a specific destination in a transmission destination database held in the local function plug-in 302. The local function plug-in 302 does not have to include the function of executing image processing. In this case, the setting of image processing is not performed. Further, if the device control library 309 receives print data or image data converted into a general-purpose format, the device control library 309 instructs a suitable operating system 317 to control processing and causes the operating system 317 to execute a job.

Next, an example of the image processing plug-in 303 will be described. The image processing plug-in 303 is capable of using the image processing function of the native image processing module 316 using a native image processing execution client 331. One of the reasons for the use of the native image processing module 316 by the image processing plug-in 303 is the increase of the processing speed in image processing. During image processing, execution of a large amount of complicated numerical computation may be needed, or a large amount of memory may be needed. In this case, the processing speed can be increased using a compiled language capable of generating an object file that is directly executable by a CPU, instead of using a programming language processing system configured to perform processing via a virtual machine such as a Java virtual machine. Meanwhile, since the native image processing module 316 is implemented as embedded software of the image forming apparatus 101 as described above, it is not easy to make a change to a module to add a function or improve stability. Thus, the native image processing module 316 can have an implementation or functional constraint. An example of a possible constraint that the native image processing module 316 can have is that the native image processing module 316 is incapable of simultaneously executing a plurality of image processing requests in the case where the plurality of image processing requests is made at the same time with respect to the same native image processing module 316.

There is a case where a plurality of image processing requests is simultaneously given to the same native image processing module 316 based on a request from the local function plug-in 302 or the device control application 304. If the native image processing module 316 having the above-described constraint receives the simultaneous image processing requests, since the native image processing module 316 cannot perform simultaneous operations, a delay can occur in the subsequent image processing, which can lead to a decrease in the responsiveness to the user using the function. As used herein, a job that requires a responsiveness to the user is a job that relates to an operation in which the user needs to check a result of image processing executed by the native image processing module 316 on the operation unit 204 or a screen, etc. provided by the web server of the image forming apparatus 101. For example, there is a function of executing optical character recognition (OCR) processing on scanned document image data using the native image processing module 316, displaying the resulting image on the operation unit 204, and setting the file name of the image data based on a recognition result corresponding to a portion selected from the displayed image. In the series of operations, if a response of the OCR processing result is delayed, the user cannot perform the next selection operation and thus occupies the operation unit 204 of the image forming apparatus 101, etc. for a long time.

Meanwhile, there is a job to which a responsiveness to the user is relatively unimportant. An example is a case in which the native image processing module 316 transmits image data as a searchable PDF after a file transmission instruction from the user. For some users, it is only necessary to check a transmission result by a log, etc. later. In this case, it is not needed to promptly respond to the operation unit 204 with the file transmission result after the transmission instruction. Another example of a case in which a responsiveness to the user is relatively unimportant is a case where the native image processing module 316 is used at the background with no input of a user instruction.

In the present exemplary embodiment, a job that requires a responsiveness to the user is managed as a job that is directly connected to a responsiveness to the user, using a responsiveness direct-connection flag.

In the present exemplary embodiment, in order to prevent a decrease in the responsiveness, the image processing plug-in 303 corresponding to the native image processing module 316 which is incapable of simultaneously executing operations holds a queue 326 for sequentially processing image processing requests received from the image processing connection library 332. The queue 326 is held so that while the native image processing module 316 which is incapable of simultaneously executing operations executes image processing, the corresponding image processing plug-in 303 can receive a new image processing request. Further, the queue 326 is provided to the image processing plug-in 303 located on the Java execution environment to thereby increase the responsiveness to the user without making a change to the embedded software located on the native execution environment.

Figure 4:
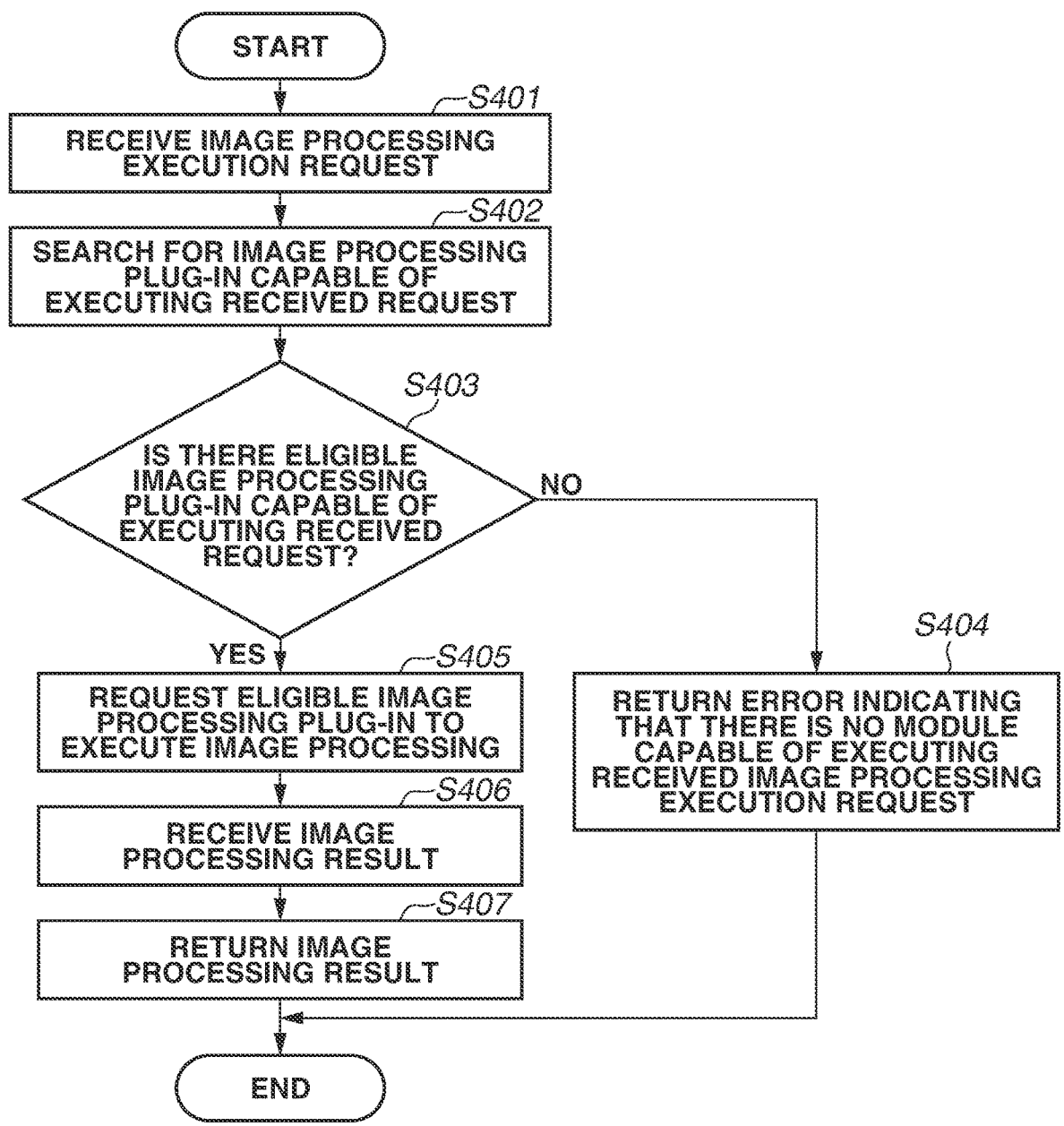
FIG. 4 is a flowchart illustrating an example of information processing.

FIG. 4 is a flowchart illustrating an example of information processing in which the image processing connection library 332 receives an image processing request and requests the image processing plug-in 303 to execute processing. An example of image processing using the image processing plug-in 303 will be described, with reference to the flowchart.

In step S401, the image processing connection library 332 receives an image processing execution request from the device control application 304 or the native image processing connection library 314 or the local function plug-in 302. At this time, the received image processing request contains a parameter that is necessary to identify the image processing plug-in 303 to which a processing request is to be transmitted.

In step S402, the image processing connection library 332 searches for the image processing plug-in 303 that is capable of executing the acquired image processing execution request.

In step S403, if there is an image processing plug-in capable of executing the received image processing request, based on the search result in step S402 (YES in step S403), the processing proceeds to step S405. On the other hand, in step S403, if there is no image processing plug-in capable of executing the received image processing request, based on the search result in step S402 (NO in step S403), the processing proceeds to step S404.

In step S404, the image processing connection library 332 returns, to the request source module, an error indicating that there is no module capable of executing the received image processing. In a case where the request source is the native image processing connection library 314, the content of the error is transmitted to the device control application 304 or the local function plug-in 302 via the device control library 309. The device control application 304 or the local function plug-in 302 displays the received content of the error on the operation screen of the application. The error enables the user to be notified of the absence of a necessary module for the processing. The processing can be continued if a serviceman or information technology (IT) administrator installs the necessary image processing plug-in 303 using the above-described installation method.

In step S405, on the other hand, the image processing connection library 332 requests the eligible image processing plug-in 303 to execute processing. If the image processing plug-in 303 receives the image processing request together with the processing parameter from the image processing connection library 332, the image processing plug-in 303 executes image processing according to the processing parameter. There are a method in which image processing is executed in the image processing plug-in 303 and a method in which image processing is executed by the native image processing module 316, and details of the methods will be described below. At the time of executing image processing by the image processing plug-in 303 or the native image processing module 316, the CPU 211 loads input data onto the RAM 212.

In step S406, the image processing connection library 332 receives a processing result from the image processing plug-in 303.

In step S407, the image processing connection library 332 returns the received processing result to each request source module.

The processing in the case where an error containing error content is returned as the received processing result will be described.

In the case where the request source is the native image processing connection library 314, the error content is transmitted to the device control application 304 or the local function plug-in 302 via the device control library 309. The device control application 304 or the local function plug-in 302 performs exceptional processing based on the received error content.

An example of the exceptional processing is retry processing. Receiving the error described above, each application can determine that a plurality of image processing is simultaneously executed on the image processing connection library 332. Thus, each application performs retry processing to wait until the currently-executed image processing is ended, and then each application re-transmits an image processing request at the timing at which the executed image processing is ended, whereby the processing is continued without interruption.

In alternative exceptional processing, an error can be displayed on the operation screen of each application to prompt the user to re-input a job after a while due to a plurality of image processing being executed simultaneously. The error enables the user to be notified that the job will be executable after a while.

The image processing plug-in 303 requested to execute image processing executes image processing based on the content of the processing request. There are two methods by which the image processing plug-in 303 executes image processing.

In the first method, image processing is executed in the image processing plug-in 303. In this case, the image processing plug-in 303 executes image processing based on the processing request and processing parameter received from the image processing connection library 332. The image processing plug-in 303 needs to be described in the Java language.

In the second method, the native image processing module 316 is requested to execute image processing. The image processing plug-in 303 requests the native image processing execution client 331 to execute processing to thereby execute image processing through a dedicated process for image processing which is different from that of the image processing plug-in 303.

Figure 5:
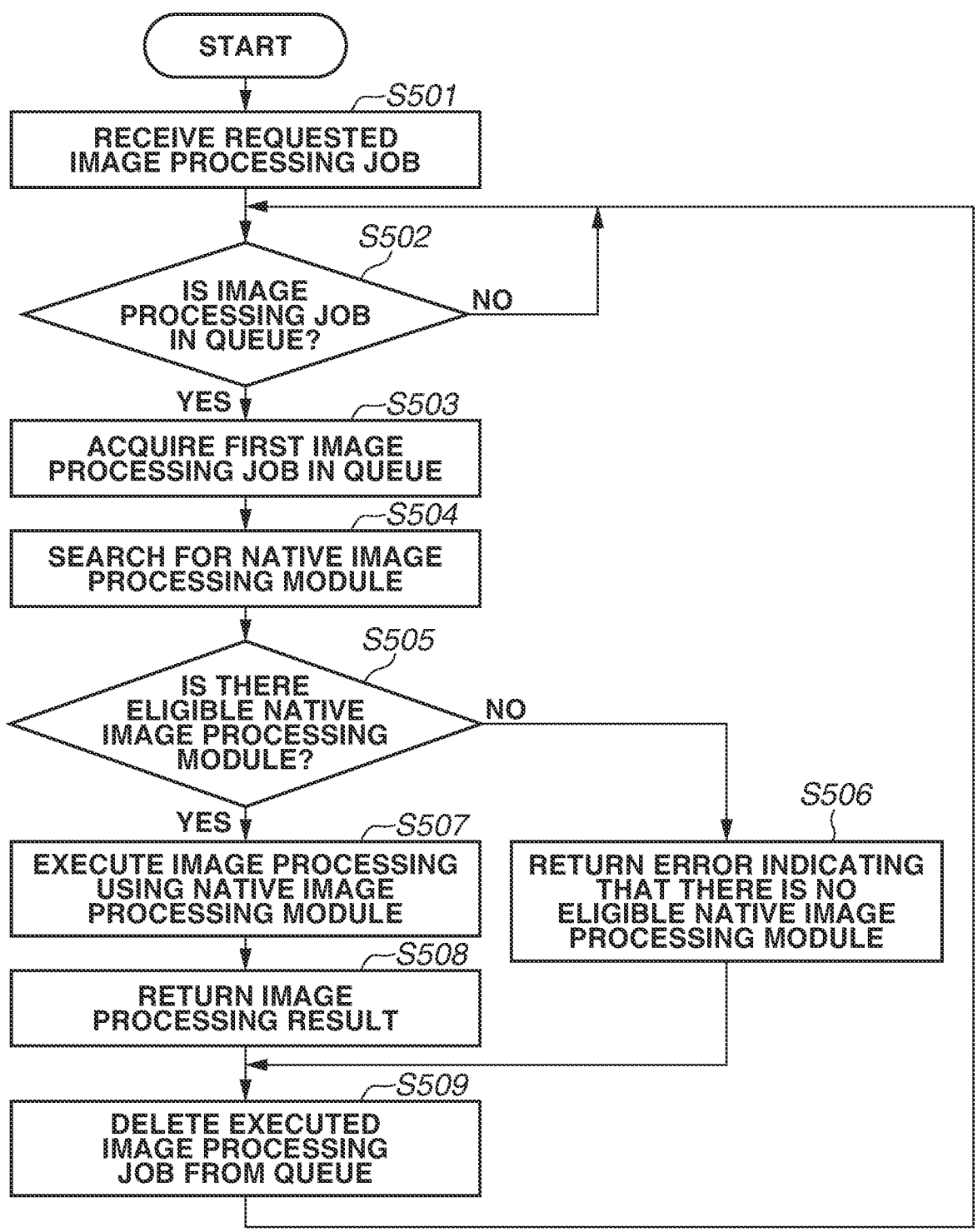
FIG. 5 is a flowchart illustrating an example of information processing.

FIG. 5 is a flowchart illustrating an example of information processing in the case where the image processing plug-in 303 executes the image processing job requested in step S405.

In step S501, the image processing plug-in 303 receives the image processing job requested in step S405 and inputs the image processing job to the queue 326. The image processing plug-in 303 holds the image processing job in the queue 326 by each processing unit of the native image processing module 316.

In step S502, the image processing plug-in 303 determines whether there is an unprocessed image processing job in the queue 326. As a result of the determination, if there is no unprocessed image processing job (NO in step S502), the image processing plug-in 303 re-executes step S502. On the other hand, if there is an unprocessed image processing job (YES in step S502), the processing proceeds to step S503.

In step S503, the image processing plug-in 303 acquires the first one of the unprocessed image processing jobs in the queue 326 and requests the native image processing execution client 331 to process the acquired image processing job. The image processing plug-in 303 selects and acquires the image processing job in the order in which the image processing job is held in the queue 326.

In step S504, first, the native image processing execution client 331 having received the request requests the native image processing execution server 315 to execute the requested image processing job. Then, the native image processing execution server 315 searches for the native image processing module 316 based on the processing parameter contained in the received image processing job.

In step S505, the native image processing execution server 315 determines whether there is an eligible native image processing module 316. As a result of the determination, if there is no eligible native image processing module 316 (NO in step S505), the processing proceeds to step S506. On the other hand, if there is an eligible native image processing module 316 (YES in step S505), the processing proceeds to step S507.

In step S506, the native image processing execution server 315 returns, to the native image processing execution client 331, an error indicating that there is no eligible native image processing module 316.

In step S507, the eligible native image processing module 316 executes image processing based on the received processing parameter.

In step S508, the eligible native image processing module 316 further returns an image processing result to the native image processing execution client 331.

In step S509 following the execution of the processing in step S506 or S504, the image processing plug-in 303 erases the image processing job acquired in step S503 from the queue 326. Then, the processing returns to step S502 again. If the native image processing execution client 331 receives the image processing result or error content, the native image processing execution client 331 returns the content of the received image processing result or error content to the image processing plug-in 303.

Figure 6:
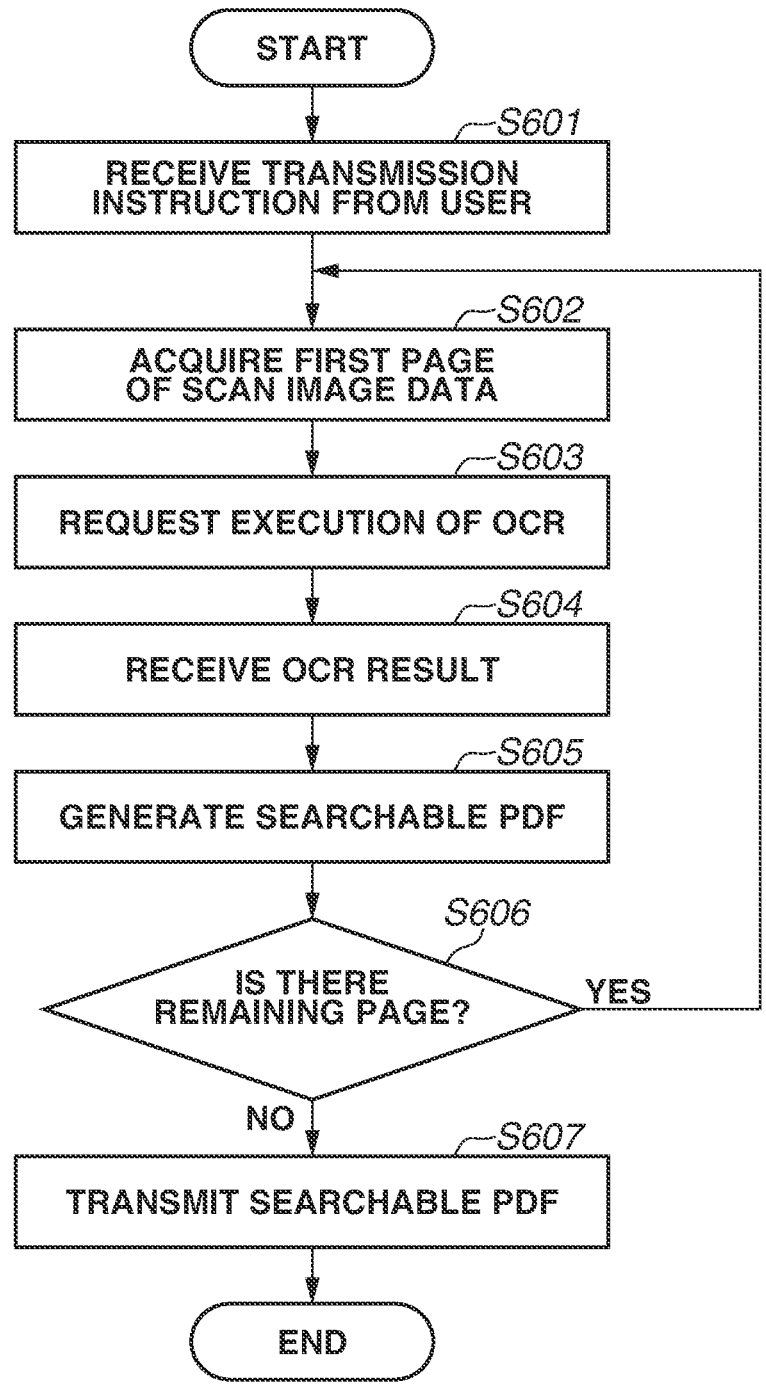
FIG. 6 is a flowchart illustrating an example of information processing.

FIG. 6 is a flowchart illustrating an example of information processing in which the scan transmission application 308 converts a scanned image into a searchable PDF and transmits the searchable PDF. The searchable PDF refers to a PDF in which character information is converted to text data. The scan transmission application 308 generates a searchable PDF using the OCR function provided by the native image processing module 316 via the native image processing connection library 314.

In step S601, the scan transmission application 308 receives an instruction to transmit scanned image data stored in the HDD 213 or the RAM 212 by the scanner 203 to a transmission destination set by the user of the image forming apparatus 101.

In step S602, the scan transmission application 308 having received the scan transmission instruction acquires the first page of the scanned image data consisting of a single page or a plurality of pages from the HDD 213 or the RAM 212.

In step S603, the scan transmission application 308 requests the image processing connection library 332 to execute OCR processing on the image data acquired in step S602. The OCR processing in step S603 is executed according to the process described above with reference to FIGS. 4 and 5.

In step S604, the scan transmission application 308 receives the OCR processing execution result returned in step S407.

In step S605, the scan transmission application 308 converts the single-page image data acquired in step S602 into a searchable PDF using the OCR processing execution result.

In step S606, the scan transmission application 308 determines whether the scanned image data includes a page that is not converted to a searchable PDF. As a result of the determination, if there is an unconverted page (YES in step S606), the processing proceeds to step S602. Then, the scan transmission application 308 re-executes steps S602, S603, S604, and S605 on a single page among the unconverted pages. On the other hand, if there is no unconverted page (NO in step S606), the processing proceeds to step S607.

In step S607, the scan transmission application 308 combines all the pages of the scanned image data converted into searchable PDFs into a single searchable PDF file and transmits the combined searchable PDF file to the transmission destination specified by the user of the image forming apparatus 101.

Figure 7:
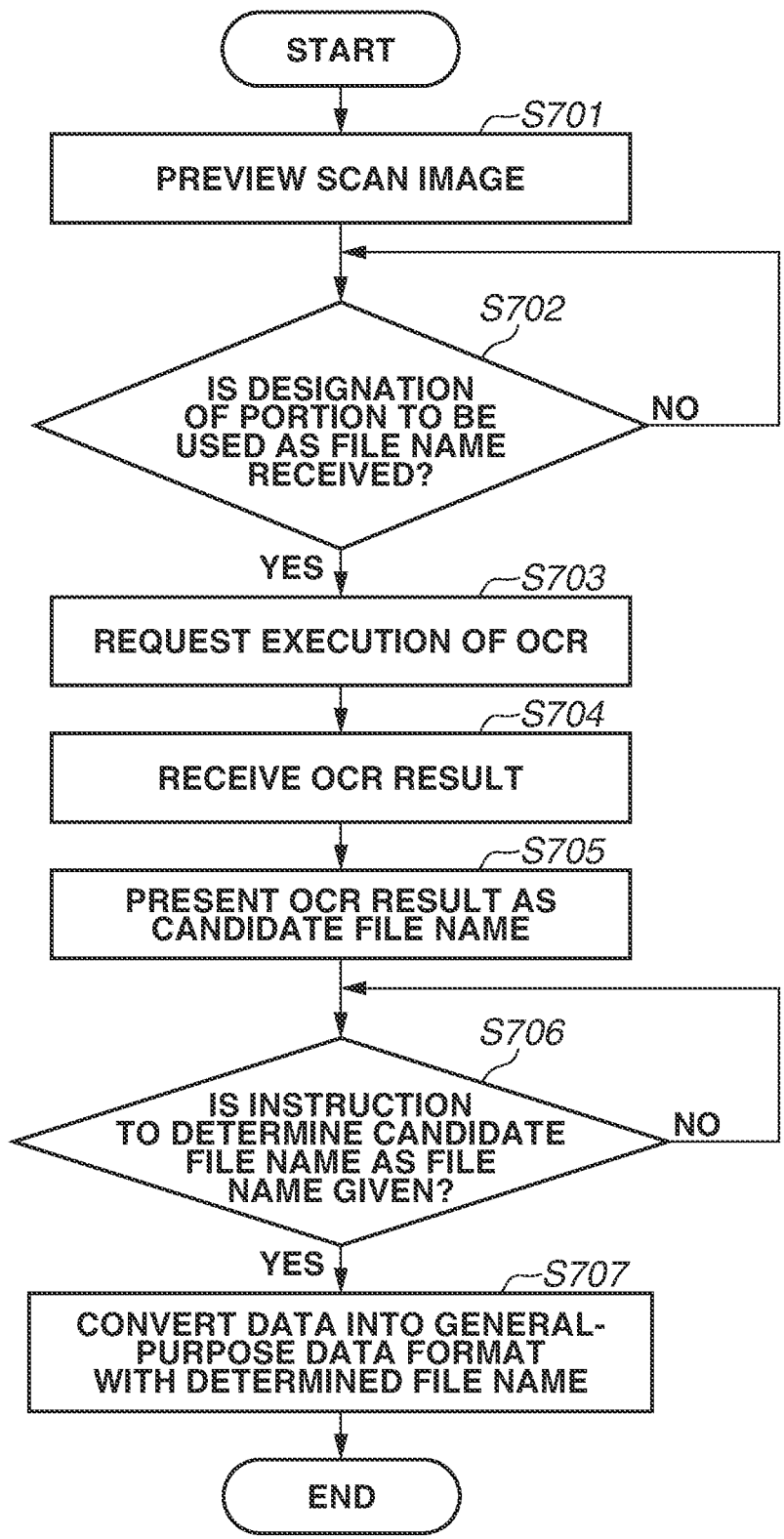
FIG. 7 is a flowchart illustrating an example of information processing.

FIG. 7 is a flowchart illustrating an example of information processing in which the file name of the file obtained by converting image data into a general-purpose format is determined based on character string data contained in a scanned image, as another example of the use of the OCR function provided by the native image processing module 316 which is different from the use method described above with reference to FIG. 6. The process illustrated in the flowchart is started upon receipt of an instruction from the user of the image forming apparatus 101 by the local function plug-in 302 for executing the above-described file name determination processing.

In step S701, the local function plug-in 302 receives an instruction to preview the scanned image data stored in the HDD 213 or the RAM 212 by the scanner 203 from the user of the image forming apparatus 101, and provides a preview display of the corresponding image data on the operation unit 204.

Figure 8:
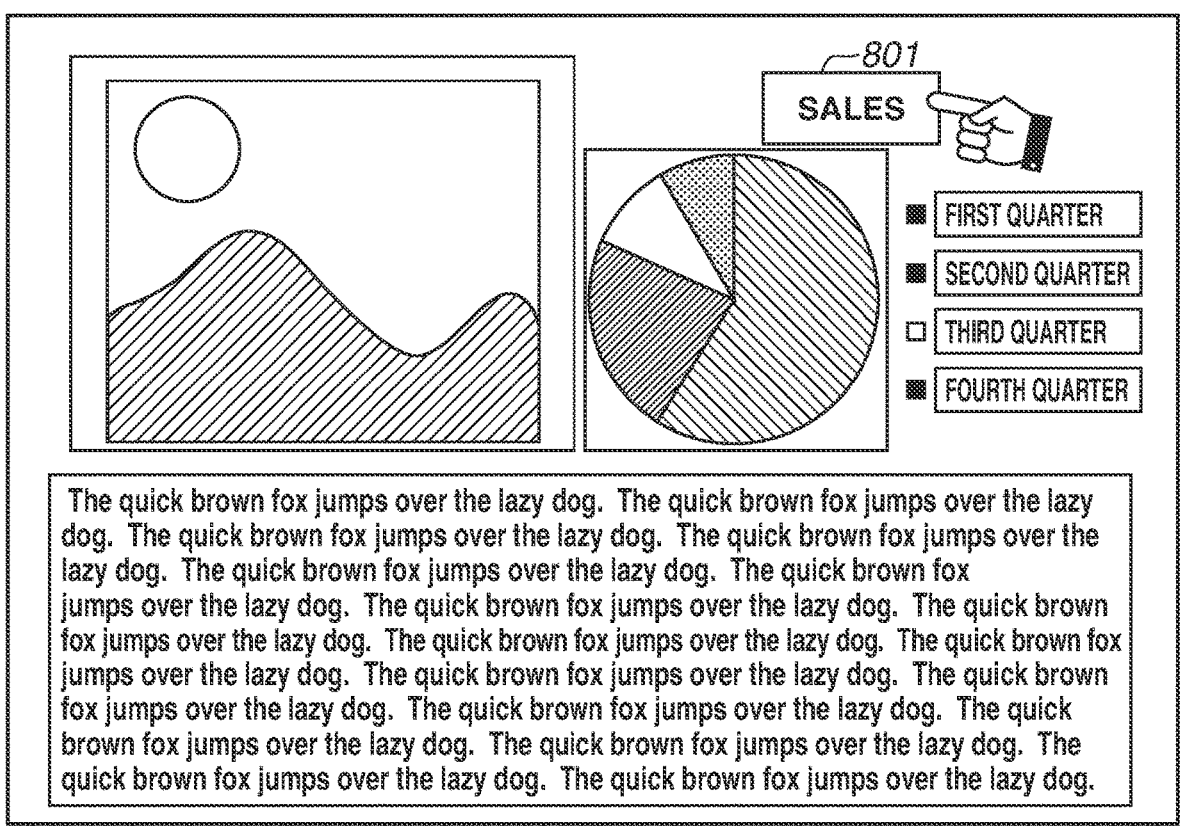
FIG. 8 illustrates an example of a scanned document preview screen.

In step S702, the local function plug-in 302 determines whether a designation of a portion to be used as the file name of the scanned image data converted to a general-purpose format is received via the preview screen displayed in step S702. FIG. 8 illustrates a scanned document preview screen displayed on the operation unit 204 in step S702 and an image of how the user designates a portion to be used as the file name. FIG. 8 illustrates a case in which the area specified by an area 801 in scanned image data is touched by the user of the image forming apparatus 101 and thus the designation of the area 801 as the file name to be used is received. If a user designation is received in this form (YES in step S702), the processing proceeds to step S703. On the other hand, if no designation is received (NO in step S702), the local function plug-in 302 continues the processing of step S702 until a designation is received.

In step S703, the local function plug-in 302 requests the image processing connection library 332 to execute OCR processing on the area 801 to convert the area 801 designated by the user into text data. The OCR processing in step S703 is executed according to the process described above with reference to FIGS. 4 and 5.

In step S704, the local function plug-in 302 receives the OCR processing execution result returned in step S407.

In step S705, the local function plug-in 302 displays the OCR processing execution result received in step S704 on the operation unit 204 and presents the result to the user as a candidate file name to be determined.

In step S706, the local function plug-in 302 determines whether an instruction to determine the presented candidate file name as the file name is given from the user. As a result of the determination, if a user instruction is given (YES in step S706), the processing proceeds to step S707. On the other hand, if no user instruction is given (NO in step S706), the processing in step S706 is continued.

In step S707, the local function plug-in 302 determines, as the file name of the scanned image data converted into the general-purpose data format, the OCR execution result for which the instruction to determine the OCR execution result as the file name is received in step S706, and converts the scanned image data into the general-purpose data format.

The foregoing configuration makes it possible to increase the responsiveness to the user even in the case where image processing requests for the native image processing module 316 having the constraint that the native image processing module 316 is incapable of executing simultaneous operations are congested. More specifically, it becomes possible to receive an image processing request that is directly connected to a responsiveness to the user, which is used to display a result of the image processing on the operation unit 204 as described above with reference to FIGS. 7 and 8, even during the execution of image processing at the background in response to an instruction from the user of the image forming apparatus 101 as described above with reference to FIG. 6. Further, the queue 326 for enabling such image processing to be received is provided at the image processing plug-in 303 on the Java execution environment and thus the above-described advantage is realized without making a change to the embedded software of the image forming apparatus 101.

In the first exemplary embodiment, even in the case where the native image processing module 316 provided as embedded software in the image forming apparatus 101 has the constraint that the native image processing module 316 is incapable of executing simultaneous operations, a decrease in the responsiveness to the user that can occur due to the constraint is prevented without making a change to the implementation of the embedded software.

In a second exemplary embodiment, the image processing plug-in 303 controls the queue 326 as appropriate to thereby further prevent a decrease in the responsiveness to the user. This will be described below with reference to the drawings. In the description of the present exemplary embodiment, only the differences from the configuration described above in the first exemplary embodiment will be described, and a similar configuration or processing to that in the first exemplary embodiment is given the same reference numeral.

Figure 9:
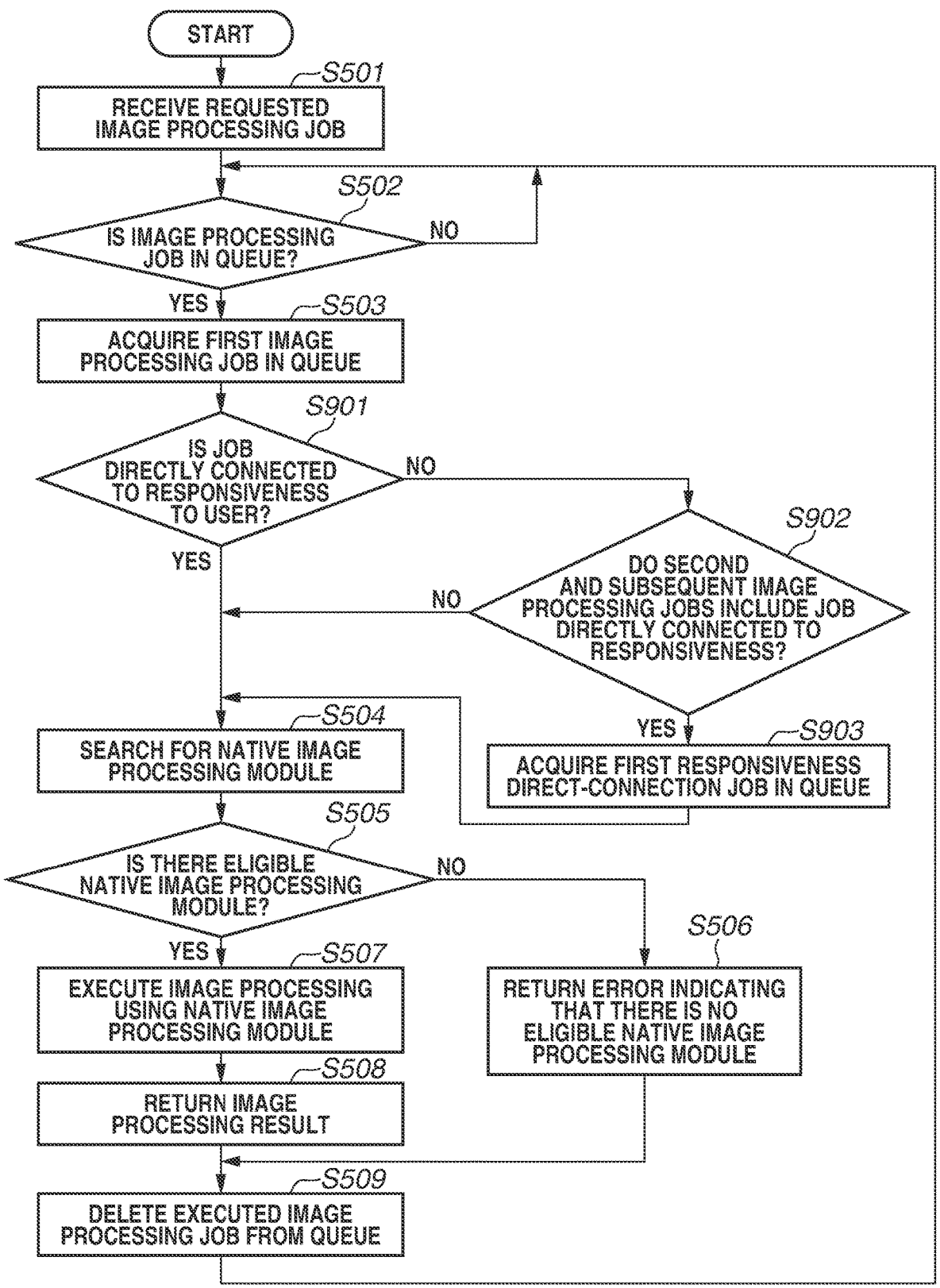
FIG. 9 is a flowchart illustrating an example of information processing.

FIG. 9 is a flowchart illustrating an example of information processing in which the image processing connection library 332 receives an image processing request and requests the image processing plug-in 303 to execute the processing. An example of image processing using the image processing plug-in 303 will be described with reference to the flowchart.

First, the image processing plug-in 303 acquires the image processing job at the head of the queue 326 acquired as a result of the processing in steps S501, S502, and S503.

In step S901, the image processing plug-in 303 determines whether the responsiveness direct-connection flag contained in the image processing job acquired in step S503 is "ON". As used herein, the responsiveness direct-connection flag refers to a flag value that can be contained in the image processing job as one of the image processing parameters described above, and the responsiveness direct-connection flag that is "ON" indicates that the image processing job is a job that is directly connected to the responsiveness to the user of the image forming apparatus 101. As a result of the determination in step S901, if the responsiveness direct-connection flag is "ON" (YES in step S901), the image processing plug-in 303 executes steps S504, S505, S507, S508, and S509, and then the image processing is completed. On the other hand, if the responsiveness direct-connection flag is "OFF" (NO in step S901), the processing proceeds to step S902. The responsiveness direct-connection flag is an example of an attribute of a job.

In step S902, the image processing plug-in 303 determines whether any of the jobs in the queue 326 at this time point is a job with the responsiveness direct-connection flag set to "ON". As a result of the determination, if none of the jobs are a job with the responsiveness direct-connection flag set to "ON" (NO in step S902), the image processing plug-in 303 executes steps S504, S505, S507, and S508 on the image processing job acquired in step S503, and then the image processing is completed. On the other hand, if any of the jobs is a job with the responsiveness direct-connection flag set to "ON" (YES in step S902), the processing proceeds to step S903.

In step S903, the image processing plug-in 303 acquires the first responsiveness direct-connection job in the queue 326 among the image processing jobs in the queue 326. Then, the image processing plug-in 303 executes steps S504, S505, S507, and S508 on the acquired image processing job, and then the image processing is completed.

Figure 10:
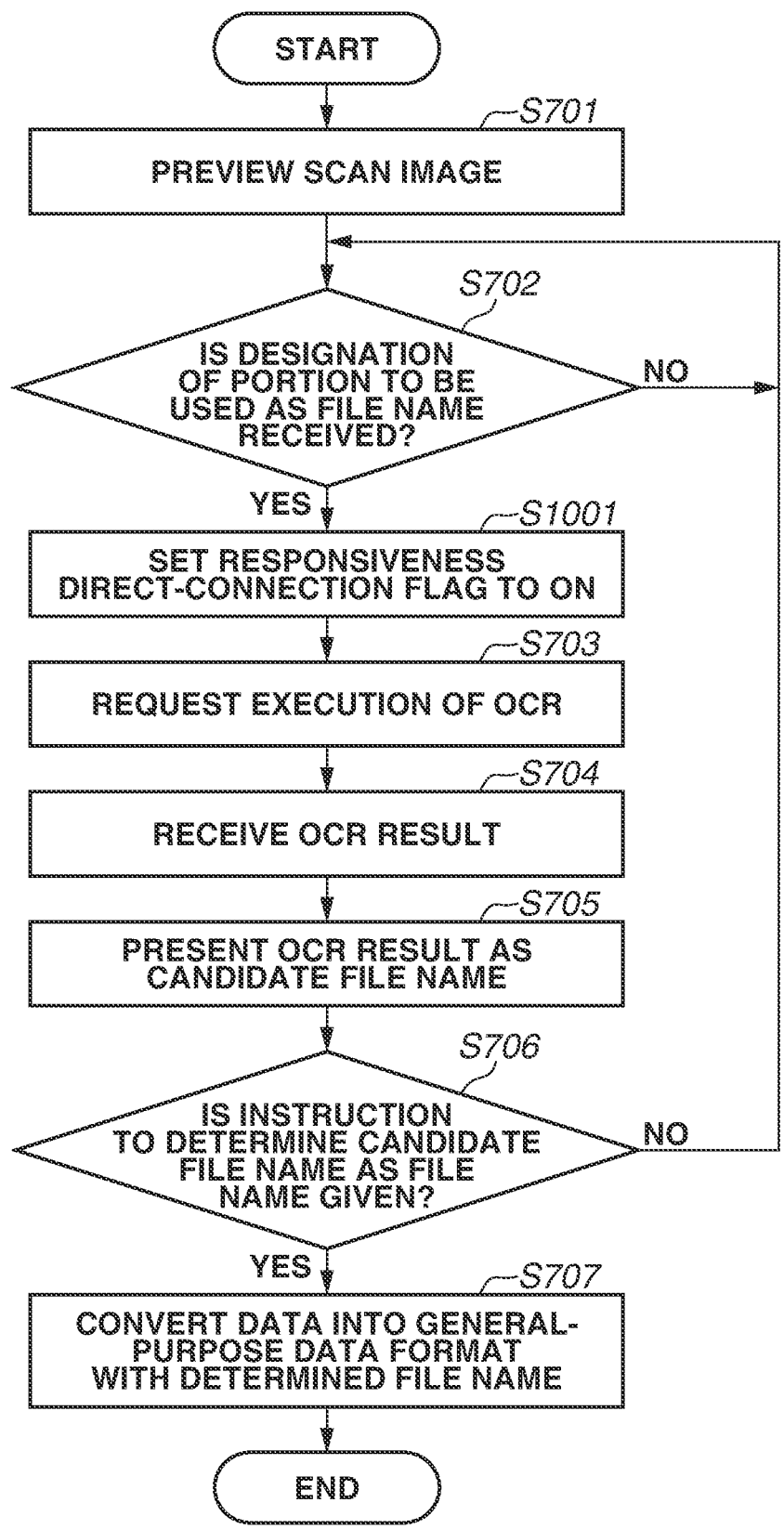
FIG. 10 is a flowchart illustrating an example of information processing.

FIG. 10 is a flowchart illustrating an example of information processing in which the responsiveness direct-connection flag is set to "ON" and the image processing job is executed in the process of determining the file name of the scanned image data converted into the general-purpose format, which is described above in the first exemplary embodiment with reference to FIG. 7.

The local function plug-in 302 receives, from the user of the image forming apparatus 101, a designation of the area 801 as the file name via steps S701 and S702. Then, in step S1001, the local function plug-in 302 sets, to "ON", the responsiveness direct-connection flag of the image processing job for which a request for execution of OCR processing on the area 801 is to be given to the image processing connection library 332. Then, the local function plug-in 302 executes steps S703, S704, S705, S706, and S707, and then the processing is completed.

Execution of the foregoing processing described with reference to FIGS. 9 and 10 not only produces the advantage described above in the first exemplary embodiment but also makes it possible to prioritize the execution of image processing that is directly connected to the responsiveness to the user, such as the file name determination process illustrated in FIG. 10, even in the case where, for example, the process of generating a searchable PDF described above with reference to FIG. 6 is to be performed on a large number of pages, so that a decrease in the responsiveness to the user is further prevented.

In a third exemplary embodiment, a method for solving the problem using a method different from that described above with reference to FIGS. 5 and 9 will be described below with reference to the drawings. In the description of the present exemplary embodiment, only the differences from the configurations described above in the first and second exemplary embodiments will be described, and a similar configuration or processing to that in the first exemplary embodiment is given the same reference numeral.

Figure 11:
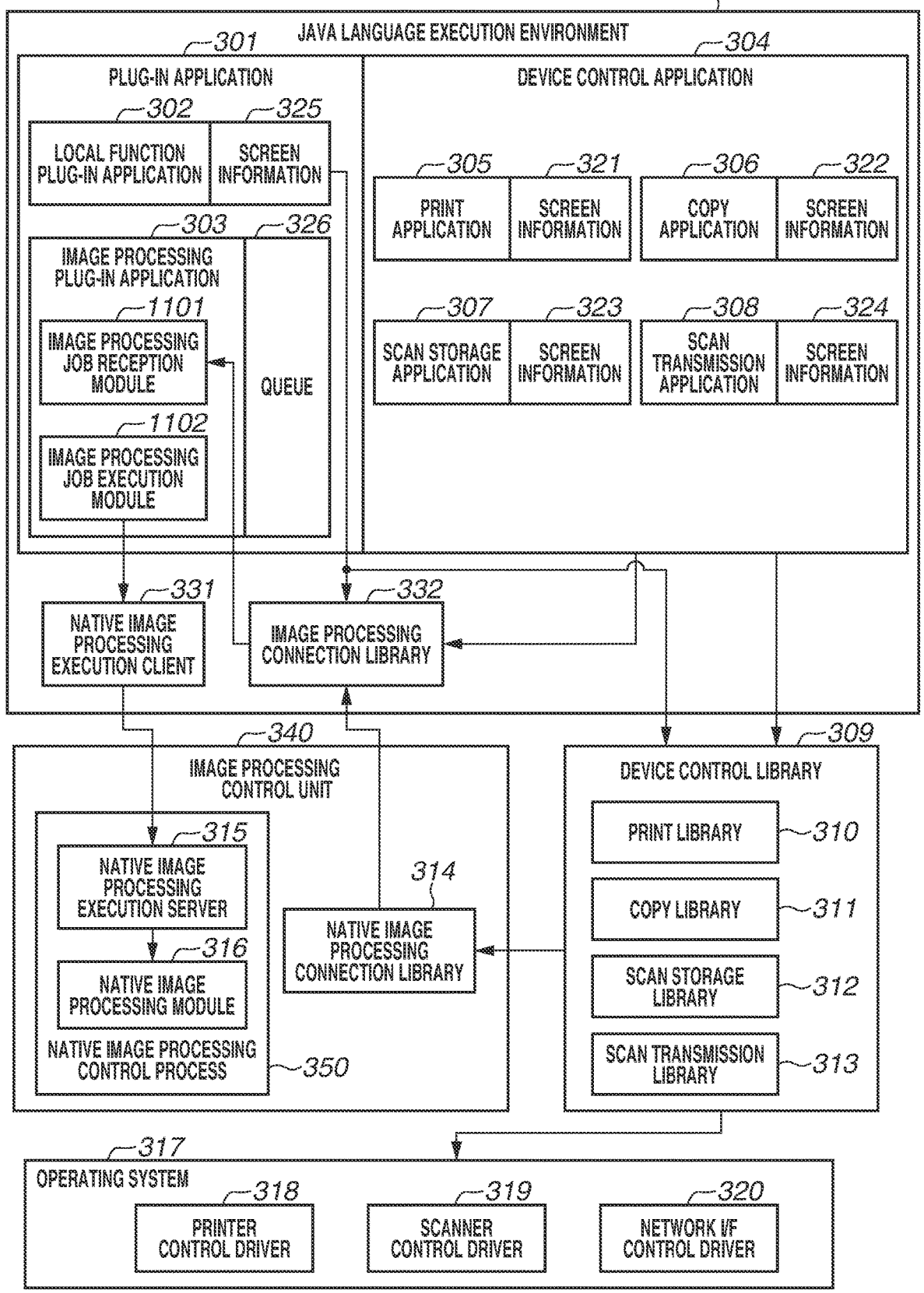
FIG. 11 is a hierarchy chart schematically illustrating an example of a software structure.

FIG. 11 is a hierarchy chart schematically illustrating an example of the software configuration of the image forming apparatus 101 in the third exemplary embodiment. In the third exemplary embodiment, the image processing plug-in 303 described above with reference to FIG. 3 further includes an image processing job reception module 1101 and an image processing job execution module 1102. The image processing job reception module 1101 executes processing to receive an image processing job requested by the image processing connection library 332 and register the requested image processing job in the queue 326. The image processing job execution module 1102 executes processing to acquire the image processing job registered in the queue 326 by the image processing job reception module 1101 and request the native image processing execution client 331 to execute the job.

Figure 12:
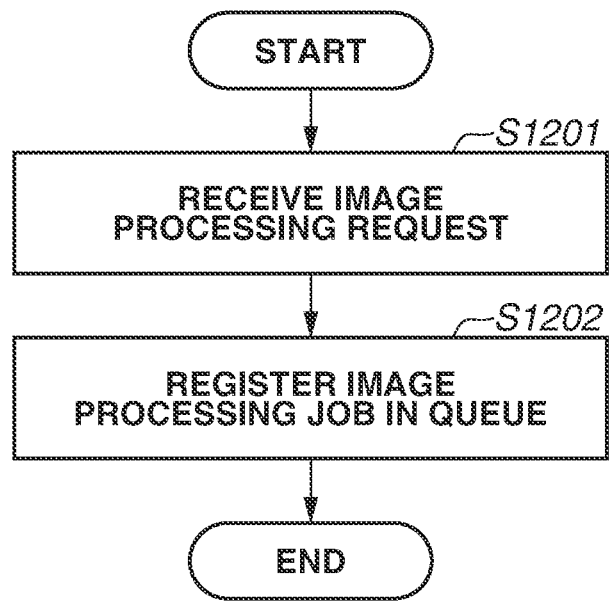
FIG. 12 is a flowchart illustrating an example of information processing.

FIG. 12 is a flowchart illustrating an example of information processing to be executed by the image processing job reception module 1101. The process illustrated in the flowchart is started when the image processing connection library 332 requests the image processing plug-in 303 to execute image processing in step S405. In step S1201, the image processing job reception module 1101 receives an image processing request from the image processing connection library 332. The image processing request received at this time contains, in addition to the image data on which the image processing is to be executed, the image processing to be executed, the responsiveness direct-connection flag, and the image processing result storage location as the image processing parameters. As used herein, the responsiveness direct-connection flag refers to a flag value that can be contained in the image processing job as one of the image processing parameters described above, and the responsiveness direct-connection flag that is "ON" indicates that the image processing job is a job that is directly connected to the responsiveness to the user of the image forming apparatus 101. Further, the image processing result storage location is a parameter for designating an area to store the image processing execution result and, for example, a file path that specifies a specific area on the HDD 213 can be designated, or any other values can be designated. In the description of the present exemplary embodiment, a file path that specifies a specific area on the HDD 213 is described as the image processing result storage location. Then, in step S1202, the image processing job reception module 1101 registers the image processing request received in step S1201 in the queue 326 as an image processing job, and the process in the flowchart is ended. The processing in step S1202 is an example of the processing of registering a single job in a queue in response to each request received in step S1201.

Figure 13:
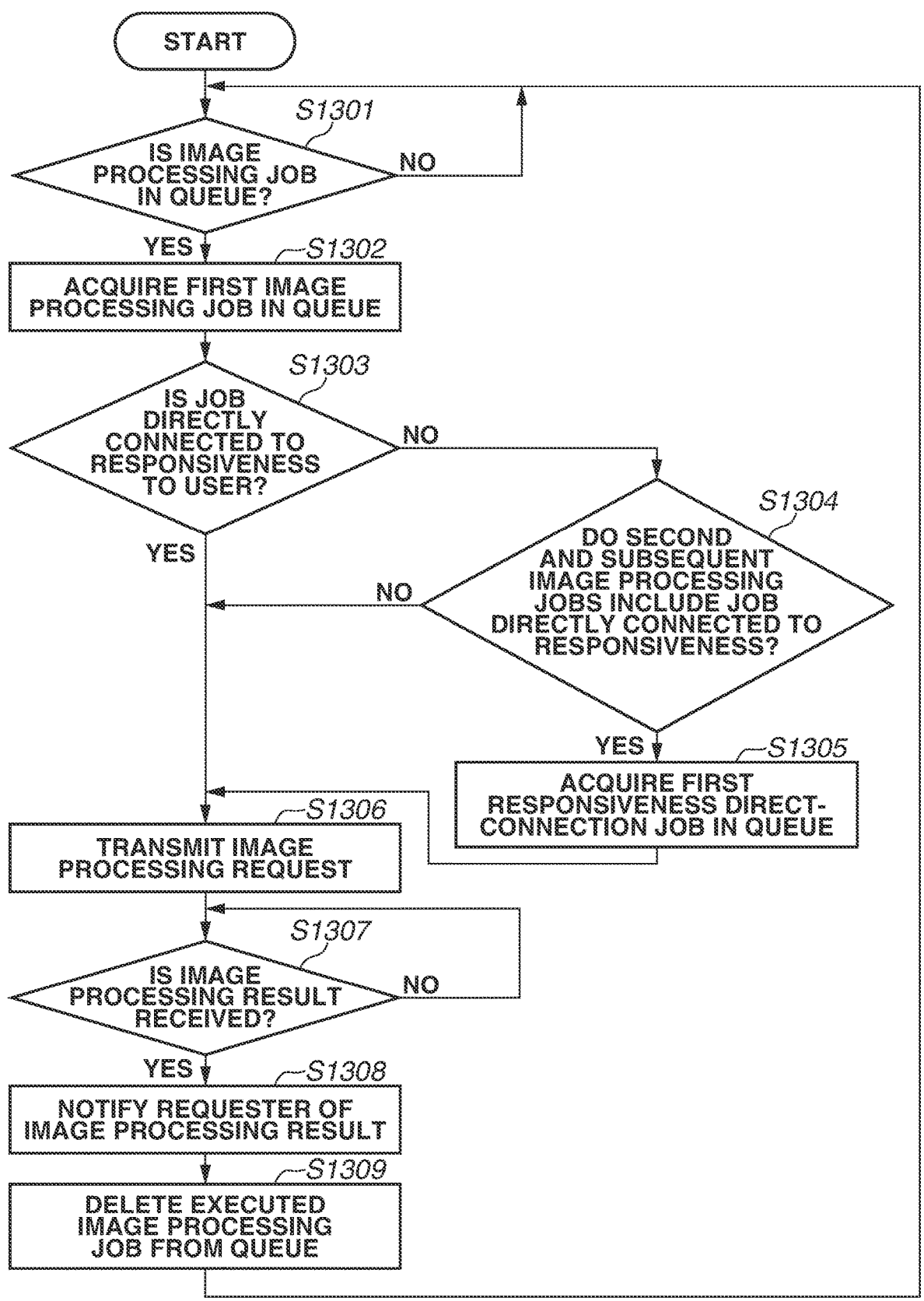
FIG. 13 is a flowchart illustrating an example of information processing.

FIG. 13 is a flowchart illustrating an example of information processing to be executed by the image processing job execution module 1102 and the native image processing execution client 331 on the image processing job.

In step S1301, the image processing job execution module 1102 determines whether there is an image processing job in the queue 326. If there is an image processing job in the queue 326 as a result of execution of step S1202 described above (YES in step S1301), the processing proceeds to step S1302. On the other hand, if there is no image processing job in the queue 326 (NO in step S1301), step S1301 is re-executed.

In step S1302, the image processing job execution module 1102 acquires the first one of the image processing jobs in the queue 326.

In step S1303, the image processing job execution module 1102 determines whether the responsiveness direct-connection flag contained in the image processing job acquired in step S1302 is "ON". As a result of the determination, if the responsiveness direct-connection flag is "ON" (YES in step S1303), the processing proceeds to step S1306. If the responsiveness direct-connection flag is "OFF" (NO in step S1303), the processing proceeds to step S1304.

In step S1304, the image processing job execution module 1102 determines whether any of the jobs in the queue 326 at this time point is a job with the responsiveness direct-connection flag set to "ON". As a result of the determination, if none of the jobs are a job with the responsiveness direct-connection flag set to "ON" (NO in step S1304), the processing proceeds to step S1306. If any of the jobs is a job with the responsiveness direct-connection flag set to "ON" (YES in step S1304), the processing proceeds to step S1305. The processing in step S1304 is an example of the processing of determining whether any job in the queue other than the job at a head of the queue is a job with the responsiveness direct-connection flag set to "ON", based on an attribute of each job contained in the queue.

In step S1305, the image processing job execution module 1102 acquires the first responsiveness direct-connection jobs in the queue 326 among the image processing jobs in the queue 326, and the processing proceeds to step S1306.

In step S1306, the image processing job execution module 1102 requests the native image processing execution client 331 to execute the image processing job acquired in step S1302 or S1305. Then, the native image processing execution client 331 generates an image processing request to the native image processing execution server 315 based on the requested image processing job, and transmits the generated request to the native image processing execution server 315. The image processing request contains information equivalent to the image processing request in step S1201, i.e., image data on which image processing is to be executed and the processing parameters such as the image processing to be executed, the responsiveness direct-connection flag, and the image processing result storage location. The process to be executed by the native image processing execution server 315 having received the image processing request will be described below with reference to FIG. 14.

In step S1307, the native image processing execution client 331 determines whether a result of the image processing request transmitted in step S1306 is received from the native image processing execution server 315. As a result of the determination, if no result is received (NO in step S1307), step S1307 is re-executed. If a result is received (YES in step S1307), the processing proceeds to step S1308.

In step S1308, the native image processing execution client 331 notifies the image processing job execution module 1102 of the image processing result received in step S1307. Then, the image processing job execution module 1102 having received the notification writes the image processing result to the image processing result storage location described in the image processing parameter of the corresponding image processing job and notifies the image processing connection library 332 of the writing.

In step S1309, the image processing job execution module 1102 erases the executed image processing job from the queue 326, and the processing returns to step S1301 to repeat step S1301 and the subsequent steps.

FIG. 14 is a flowchart illustrating an example of information processing to be executed by the native image processing execution server 315 and the native image processing module 316.

In step S1401, the native image processing execution server 315 determines whether the image processing request transmitted from the native image processing execution client 331 in step S1306 is received. As a result of the determination, if the image processing request is not received (NO in step S1401), step S1401 is re-executed. If the image processing request is received (YES in step S1401), the processing proceeds to step S1402.

In step S1402, the native image processing execution server 315 searches for the native image processing module 316 that is eligible to be requested to execute image processing, based on the processing parameters contained in the received image processing request.

In step S1403, the native image processing execution server 315 determines whether there is an eligible native image processing module 316, as a result of the search in step S1402. As a result of the determination, if there is no eligible native image processing module 316 (NO in step S1403), the processing proceeds to step S1406. If there is an eligible native image processing module 316 (YES in step S1403), the processing proceeds to step S1404.

In step S1404, the native image processing execution server 315 transmits the image data on which image processing is to be executed and the processing parameters to the native image processing module 316 that is to execute image processing, and requests the native image processing module 316 to execute image processing. The native image processing module 316 having received the request executes image processing based on the received image data and processing parameters and notifies the native image processing execution server 315 of the processing result.

In step S1405, the native image processing execution server 315 returns the image processing result to the native image processing execution client 331 in response to the image processing request received in step S1401, and the processing returns to step S1401.

In step S1406, the native image processing execution server 315 returns, as a response to the native image processing execution client 331, an error message indicating that there is no native image processing module 316 capable of executing the image processing request received in step S1401, and the processing returns to step S1401.

Implementation of the above-described configuration and procedures enables the image processing job reception module 1101 and the image processing job execution module 1102 to execute processing asynchronously even in the case where image processing requests (step S603, S703) are congested as described above with reference to FIGS. 6, 7, and 10. Thus, a decrease in the responsiveness to the user is prevented by a different method from those described above with reference to FIGS. 5 and 9.

Other Exemplary Embodiment

An exemplary embodiment of the present disclosure is also realizable by the following process. Specifically, a program for realizing one or more functions of the above-described exemplary embodiments is supplied to a system or apparatus via a network or storage medium. Then, one or more processors of a computer of the system or apparatus read and execute the program. Further, an exemplary embodiment of the present disclosure is also realizable by a circuit (e.g., application-specific integrated circuit (ASIC)) for realizing one or more functions.

While examples of exemplary embodiments of the present disclosure have been described in detail, the present disclosure is not to be limited to any specific exemplary embodiment.

In the configurations described in the first and second exemplary embodiments, in the case where there is a constraint on the native image processing module 316 to execute OCR processing that the native image processing module 316 is incapable of simultaneously executing operations, the corresponding image processing plug-in 303 holds the queue 326 for the OCR image processing jobs. The configurations, however, are not limited to those described above. For example, an image processing module capable of executing OCR processing can be provided in the Java language execution environment 330 or on the server 105 separately from the native image processing module 316 for executing OCR processing that is described in the first and second exemplary embodiments. Further, the image processing plug-in 303 corresponding to the image processing module can have a configuration including no queue 326. In this configuration, the image processing plug-in 303 can select which module to be used among the plurality of OCR processing execution modules based on an appropriate criterion.

According to the above-described exemplary embodiments, a decrease in the responsiveness to the user is prevented even in the case where the image processing requests to the image processing module implemented as embedded software having the constraint that the image processing module is incapable of simultaneously executing operations are congested. Further, such an advantage is realized without making a change to the embedded software.

According to the above-described exemplary embodiments, a decrease in the responsiveness to the user is prevented.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Applications No. 2018-038819, filed Mar. 5, 2018, and No. 2018-117968, filed Jun. 21, 2018, which are hereby incorporated by reference herein in their entirety.

What is claimed is:

1. An image processing apparatus including an image processing module, the image processing apparatus comprising:
   at least one memory that stores instructions; and
   at least one processor that executes the stored instructions to:
   receive a request for image processing to be executed by the image processing module;
   register jobs in a queue each of which corresponds to the received request;
   determine, based on an attribute of each job contained in the queue, whether there is a predetermined type of job in the queue other than a job at a head of the queue, wherein the predetermined type of job is a job that requires an operation in which a user checks a result of the image processing executed by the image processing module and wherein the job at the head of the queue is not the predetermined type of job; and
   request the image processing module to execute the image processing based on the job acquired from the queue, wherein in a case where it is determined that there is the predetermined type of job in the queue other than the job at the head of the queue, the image processing module is requested to execute the image processing based on the predetermined type of job acquired from the queue, whereas in a case where it is determined that there is not the predetermined type of job in the queue other than the job at the head of the queue, the image processing module is requested to execute the image processing based on the job at the head of the queue.

2. The image processing apparatus according to claim 1, wherein in a case where there are more than one jobs which are the predetermined type in the queue other than the job at the head of the queue, the image processing module is requested to execute the image processing based on the first one of the more than one jobs in the queue.

3. The image processing apparatus according to claim 1, wherein the at least one processor executes the stored instructions further to erase an executed job from the queue when the image processing by the image processing module is completed.

4. An information processing method to be executed by an image processing apparatus including an image processing module, the method comprising:
  receiving a request for image processing to be executed by the image processing module;
  registering jobs in a queue each of which corresponds to the received request;
  determining, based on an attribute of each job contained in the queue, whether there is a predetermined type of job in the queue other than a job at a head of the queue, wherein the predetermined type of job is a job that requires an operation in which a user checks a result of the image processing executed by the image processing module and wherein the job at the head of the queue is not the predetermined type of job; and
  requesting the image processing module to execute the image processing based on the job acquired from the queue,
  wherein in a case where it is determined that there is the predetermined type of job in the queue other than the job at the head of the queue, the image processing module is requested to execute the image processing based on the predetermined type of job acquired from the queue, whereas in a case where it is determined that there is not the predetermined type of job in the queue other than the job at the head of the queue, the image processing module is requested to execute the image processing based on the job at the head of the queue.

5. The information processing method according to claim 4, wherein in a case where there are more than one jobs which are the predetermined type in the queue other than the job at the head of the queue, the image processing module is requested to execute the image processing based on the first one of the more than one jobs in the queue.

6. The information processing method according to claim 4, further comprising erasing an executed job from the queue when the image processing by the image processing module is completed.

7. A non-transitory computer-readable storage medium storing a program for causing a computer to execute an information processing method of an image processing apparatus including an image processing module, the method comprising:
  receiving a request for image processing to be executed by the image processing module;
  registering jobs in a queue each of which corresponds to the received request;
  determining, based on an attribute of each job contained in the queue, whether there is a predetermined type of job in the queue other than a job at a head of the queue, wherein the predetermined type of job is a job that requires an operation in which a user checks a result of the image processing executed by the image processing module and wherein the job at the head of the queue is not the predetermined type of job; and
  requesting the image processing module to execute the image processing based on the job acquired from the queue,
  wherein in a case where it is determined that there is the predetermined type of job in the queue other than the job at the head of the queue, the image processing module is requested to execute the image processing based on the predetermined type of job acquired from the queue, whereas in a case where it is determined that there is not the predetermined type of job in the queue other than the job at the head of the queue, the image processing module is requested to execute the image processing based on the job at the head of the queue.

8. The non-transitory computer-readable medium according to claim 7, wherein in a case where there are more than one jobs which are the predetermined type in the queue other than the job at the head of the queue, the image processing module is requested to execute the image processing based on the first one of the more than one jobs in the queue.

9. The non-transitory computer-readable medium according to claim 7, wherein an executed job is erased from the queue when the image processing by the image processing module is completed.

* * * * *